(12) United States Patent
Knüsel (10) Patent No.: US 11,990,052 B2
(45) Date of Patent: May 21, 2024

(54) DEVICE COMPRISING AN ELECTRONIC UNIT, SET COMPRISING A DEVICE OF THIS KIND, ASSOCIATED USE, AND METHOD FOR UTILIZING A SET OF THIS KIND

(71) Applicant: TRIHOW AG, Zug (CH)

(72) Inventor: Beat Knüsel, Immensee (CH)

(73) Assignee: TRIHOW AG, Rotkreuz (CH)

( * ) Notice: Subject to any disclaimer, the term of this patent is extended or adjusted under 35 U.S.C. 154(b) by 837 days.

(21) Appl. No.: 16/604,874

(22) PCT Filed: Apr. 11, 2018

(86) PCT No.: PCT/EP2018/059290
§ 371 (c)(1),
(2) Date: Oct. 11, 2019

(87) PCT Pub. No.: WO2018/189243
PCT Pub. Date: Oct. 18, 2018

(65) Prior Publication Data
US 2020/0160737 A1      May 21, 2020

(30) Foreign Application Priority Data
Apr. 12, 2017   (CH) .................................. 00500/17

(51) Int. Cl.
G09B 1/38        (2006.01)
G09B 1/32        (2006.01)
G09B 5/00        (2006.01)

(52) U.S. Cl.
CPC ............... *G09B 1/38* (2013.01); *G09B 1/325* (2013.01); *G09B 5/00* (2013.01)

(58) Field of Classification Search
CPC combination set(s) only.
See application file for complete search history.

(56) References Cited

U.S. PATENT DOCUMENTS 5,746,638 A   5/1998 Shiraishi
6,062,937 A   5/2000 Kikuchi
(Continued)

FOREIGN PATENT DOCUMENTS

CH         713688 A1 * 10/2018 ............. G09B 1/325
CN     106999781 A      8/2017
(Continued)

OTHER PUBLICATIONS

International Preliminary Report dated Oct. 15, 2019 with Written Opinion for PCT/EP2018/059290 filed Apr. 11, 2018 (English translation).

(Continued)

*Primary Examiner* — Xuan M Thai
*Assistant Examiner* — Sadaruz Zaman
(74) *Attorney, Agent, or Firm* — Paul D. Bianco; Stephen Bongini; Fleit Intellectual Property Law (57) ABSTRACT

A device for presentation and training in project work or group work includes a housing with cages configured in the interior to be adjacent to a surface segment at least in each corner and/or in the edges and/or in grids. A permanent magnet is arranged in each of the cages so that all magnets can orient themselves. The housing includes an electronic unit having a data memory on which at least one ID number is stored, a switch, and a transmitter connected to the switch and having an antenna. The transmitter wirelessly transmits the ID number to a controller and trigger a further process, which assigns the device a meaning within the scope of the project or group work. A related set comprises at least two devices, and can be used for presentation, training, project work or group work. A related method for digitalizing manually compiled specifications uses the set.

33 Claims, 3 Drawing Sheets

(56) References Cited

U.S. PATENT DOCUMENTS

| | | | |
|---|---|---|---|
| 10,195,538 B2 | 2/2019 | Madsen | |
| 10,625,173 B2 | 4/2020 | Kaersgaard | |
| 10,773,179 B2* | 9/2020 | LaCrosse | A63F 13/25 |
| 11,183,075 B2* | 11/2021 | Lee | G01P 13/00 |
| 11,185,267 B2* | 11/2021 | Landau | A61B 5/4064 |
| 11,210,960 B2* | 12/2021 | Treml | G09B 1/18 |
| 2005/0101314 A1* | 5/2005 | Levi | H04L 63/0861 |
| | | | 348/14.02 |
| 2005/0164595 A1 | 7/2005 | Toht | |
| 2007/0154870 A1* | 7/2007 | Ongkojoyo | G09B 5/00 |
| | | | 434/236 |
| 2010/0003651 A1* | 1/2010 | Zilber | A63F 9/24 |
| | | | 463/31 |
| 2012/0004031 A1* | 1/2012 | Barney | A63F 13/285 |
| | | | 463/31 |
| 2012/0258436 A1* | 10/2012 | Lee | G09B 1/10 |
| | | | 434/362 |
| 2015/0258462 A1* | 9/2015 | Wei | A63H 33/06 |
| | | | 446/92 |
| 2016/0101370 A1 | 4/2016 | Madsen | |
| 2016/0125764 A1* | 5/2016 | Becker | G09B 9/00 |
| | | | 219/136 |
| 2018/0065058 A1* | 3/2018 | LaCrosse | A63F 13/5375 |
| 2018/0103886 A1* | 4/2018 | Landau | A61B 5/4064 |
| 2020/0160737 A1* | 5/2020 | Knüsel | G09B 1/38 |
| 2020/0302810 A1* | 9/2020 | Lee | G01P 13/00 |
| 2022/0246050 A1* | 8/2022 | Dombreval | G09B 1/06 |

FOREIGN PATENT DOCUMENTS

| | | |
|---|---|---|
| DE | 69509743 T2 | 9/1999 |
| EP | 1559464 A1 | 8/2005 |
| JP | H08257252 A | 10/1996 |
| JP | H11-128547 A | 5/1999 |
| JP | 2013-62770 A | 4/2013 |
| JP | 2015-232861 A | 12/2015 |
| JP | 2017-518852 A | 7/2017 |
| JP | 2017-530848 A | 10/2017 |
| KR | 10-2017-0068532 A | 6/2017 |
| WO | 2006/092358 A2 | 9/2006 |
| WO | 2011/011084 A1 | 1/2011 |
| WO | 2011/112498 A1 | 9/2011 |

OTHER PUBLICATIONS

European Examination Report dated May 11, 2021, for European Patent Application No. 18 715 744.1 (with English translation) (11 pages).

International Search Report dated Jun. 11, 2018, for International Application No. PCT/EP2018/059290 filed Apr. 11, 2018 (3 pages) (English translation).

Notification of Reason for Rejection dated Mar. 11, 2022 for Japanese Patent Application No. 2020-505524 (6 pages).

Swiss Search Report dated Jul. 17, 2017 (1 page).

International Search Report dated Jun. 11, 2018, for PCT/EP2018/059290 filed Apr. 11, 2018.

Written Opinion for PCT/EP2018/059290 filed Apr. 11, 2018.

* cited by examiner

DEVICE COMPRISING AN ELECTRONIC UNIT, SET COMPRISING A DEVICE OF THIS KIND, ASSOCIATED USE, AND METHOD FOR UTILIZING A SET OF THIS KIND

TECHNICAL FIELD

The invention relates to a device for presentation and training in project or group work, comprising a housing comprising an interior, wherein the housing has at least three corners and at least three edges, which connect the corners to one another and border a surface segment. Cages are configured in the interior at least in each corner and/or at least in the edges and/or in grids adjacent to the surface segment, in each of which cages a permanent magnet is arranged in a captive and moveable manner, so that all magnets can orient themselves, depending on polarization. The invention also relates to a set comprising devices of this kind as well as a utilization of a set of this kind and a method utilizing this set.

PRIOR ART

Devices of this kind are known, albeit for purposes other than those described above, and are used in particular in the toy industry. For instance, plates are configured, which adhere to one another due to the magnets, so that the children can create assemblies therewith, which are to represent, for example, houses or other three-dimensional structures.

However, the present invention does not deal with toys but with didactic tools for presentation, training, project and group work. For example, inputs from various participants are collected, recorded and displayed in a certain way for the process of brainstorming. For instance, keywords can be written on self-adhesive notepaper and can be randomly adhered to a board and be moved around in order to visually display associations. Wall-sized electronic touchscreen displays are known from other publications, on which information illustrated there can be magnified or minimized, respectively, shifted, supplemented or deleted with only a few hand movements. New information can be uploaded to the wall by means of tablets, smartphones or computers.

All of these tools are extremely limited and hardly allow for the displayed information to be physically separated. Assistance is also not offered in this way.

US 2012/0258436 A1 describes above-described components in the form of cubes, with the help of which motor skills and cognitive skills of test subjects are to be analyzed and monitored for therapeutic purposes. The test subjects have to replicate given objects, for example with blocks printed on all sides or have to solve other problems. The level of difficulty of the next problem is based on the determined time for solving the problem.

SUMMARY OF THE INVENTION

One aspect of the present invention relates to tools of the above-described type for presentation and training in project or group work, to which individual meanings can be assigned in connection with the respective project or group work and which can be physically joined together and separated in a work process to form partial or overall results. In addition, they are to be able to have a controller electronically identify the respective results at desired points in time as well as to provide further information to the controller at desired points in time. It is to be possible to assign meanings to the individual devices, whereby a structure of a plurality of devices of this kind can, in turn, represent a meaning within the scope of the envisaged work. The results are to subsequently be capable of being electronically evaluated by the controller and of being displayed in suitable form. Another aspect of the present invention relates to further modules or instruments display stored information at a desired point in time. This aspect also comprises the description of the procedure in the case of a corresponding method. A system, which comprises tools of this kind and the controller, is to in particular be able to offer assistance at a desired point in time. This is to take place in particular in the form of instructions or a selection process.

Accordingly, a set, an auxiliary device for a set, a utilization of this set, as well as a method for utilizing this set are disclosed. Further advantageous embodiments are also disclosed. The auxiliary device is a device, by means of which every existing set can be expanded in any desired manner.

According to the invention, the housing of an above-mentioned device of this kind comprises an electronic unit comprising a data memory, on which at least one ID number is electronically stored. In addition, this unit is provided with a switch, which can be triggered by actuation by a user, as well as with a transmitter connected to the switch and to the data memory, comprising antenna, which transmitter, when the switch is actuated, can wirelessly transmit at least the ID number to a controller and can trigger a further process, which for example assigns the device a meaning within the scope of the project or group work.

The switch makes it possible for the user to trigger an inquiry or to start a program at the point in time desired by him in order to establish an assignment in the form of a meaning to this device. It can be provided, for example, that the next photo, which is taken by means of a camera, which is connected to the controller, is assigned to the corresponding device. Certain persons, for example decision makers of individual fields of activity, can thus be assigned to individual devices. Or an input device in the form of a keypad can identify meanings, such as "web shop", "market stall" or "shop in shop", in order to assign different distribution channels to individual devices.

The set according to the invention has a plurality of devices of this kind as well as a controller, which has wireless access to all data memories of all of devices assigned thereto as well as, if applicable, to the measurement data identified by these devices. In addition, the controller has access to a database, which comprises the ID numbers of all devices assigned thereto as well as additional data relating to these ID numbers.

The set according to the invention is suitable for utilization for presentation and training in connection with project and group work, because information can be assigned to the individual devices and because they can be joined together to form groups or structures, and because the information, which is created in this way, of association and causation can be processed by the controller into links with an internal logic. Depending on how the controller is programmed, the result can be a display, which displays certain information on a projection wall, or a plan, such as a schedule, for example a project schedule, in the case of which the instructions and schedule guidelines specified in the structure are considered.

The method according to the invention describes a method for digitizing manually compiled specifications using a set of this kind. In a work process, two or more devices are thereby arranged and fastened to one another by means of their magnets in a room comprising a controller. At least one switch of a device is subsequently actuated, whereby at least the ID number of the respective device is transmitted to the controller. The controller accesses the database and retrieves data on the ID number of this device, which is stored. Based on this data, the controller issues instructions to a further electronic module, to which it is connected.

This can be the display of certain information, which includes, for example, further instructions or first insights, on a display.

In a simple example, the participants are to organize the preparation of a meal, an omelet. A participant takes a first device and actuates the switch. The controller identifies the device, for example by means of the ID number 01, and recognizes that no data is stored yet to this end. It thus asks the user to give a meaning to this device. This request can be made acoustically or by display on a display. The user takes a pen and writes "prepare dough" on the device, he also gives this information to the controller. This can, in turn, be made acoustically, whereby a speech recognition generates a corresponding text therefrom. On the other hand, a corresponding photo camera or video camera could be utilized, which automatically assigns the next generated image to this ID number. Needless to say, the text can also be input, for example, on a tablet, by means of a keypad or handwritten, processed subsequently by means of a character recognition.

The device with ID number 01 has now received the assignment or meaning "prepare dough", and corresponding information is stored in the database at ID number 01. The process is repeated subsequently, so that for example "bake dough", "prepare filling", "set table", and "shop" is assigned to further devices. The individual work packages can now be further narrowed down, in that each work step at "prepare dough" is assigned to a further device, for example "measure dough ingredients", "mix dough ingredients", "stir dough", including "allow dough to rest". These individual devices can now be attached to the first device "prepare dough" by means of their permanent magnets, whereby structures can be generated in three dimensions. To identify the association thereof electronically, for example the switch of "prepare dough" can be actuated, followed by all switches of the assigned devices, and finally followed and concluded by the re-actuation of the first device. The controller now knows, which devices are combined to form a group. This step can be further narrowed down in that "measure ingredients" as group is divided again into smaller individual packets, which comprises each individual ingredient.

After each group of participants has equipped its base plate with the individual tasks, a plurality of device groups, which, in turn, can now be arranged, are located in the room. Additional information can now be given to the controller, if, for example by means of voice command "prepare dough before baking dough" or "allow dough to rest while preparing filling" is spoken, after the corresponding switches were actuated.

Parallel thereto, the controller can display the received information, for example graphically or in table form. In addition, further information, such as the duration of the individual activities, details about how many workers are required for an activity, and/or costs associated therewith, can be transmitted to the controller.

Depending on what kind of a process is to be developed, the controller has to be programmed accordingly or the respective appropriate program is to be selected from the existing programs. The controller can evaluate the details, can make calculations, such as total costs, total expenditure of time, number of required workers, etc. It can accordingly create project schedules or also graphic displays in the form of mind maps, or also architectonic models, if, for example, every device represents a kitchen unit comprising certain masses, the order, distances and orientations of which are input accordingly, as well as linearized event logs, screen presentations or websites.

What is in accordance with the invention about the present invention is the bilateral interaction between the user and the controller, which is made possible by means of the switch. As soon as the controller identifies the signal of the switch, the device of which it recognizes by the transmission of the ID number, said controller can give and/or receive instructions based on the specifications known to it. Due to the fact that the transmission of the ID number requires only very little energy, the device can usually manage without energy storage. The energy required for the transmission of the ID number and further data, if need be, can be obtained, for example, from the surrounding area or can be generated by means of a piezoelectric crystal when pressing the switch itself.

This ensures a simple and cost-effective construction of the device according to the invention. The switch itself is preferably configured to be flat and does not protrude from the surface, in which it is attached. A second device according to the invention can thus be attached flat to the surface comprising the switch, without thereby triggering a signal. If the devices have Hall sensors, which can recognize the proximity of a further device, the information that the first device is connected to the second device, can additionally be transmitted by the actuation of the switch of the second device according to the invention, whereby these two devices can be identifies as group. Depending on the program, which is selected for the respective project work on the controller, the actuation of a switch can trigger a different function.

BRIEF DESCRIPTION OF THE DRAWINGS

The invention will be described in more detail below with reference to the drawings, in which.

WAYS FOR CARRYING OUT THE INVENTION

Figure 1:
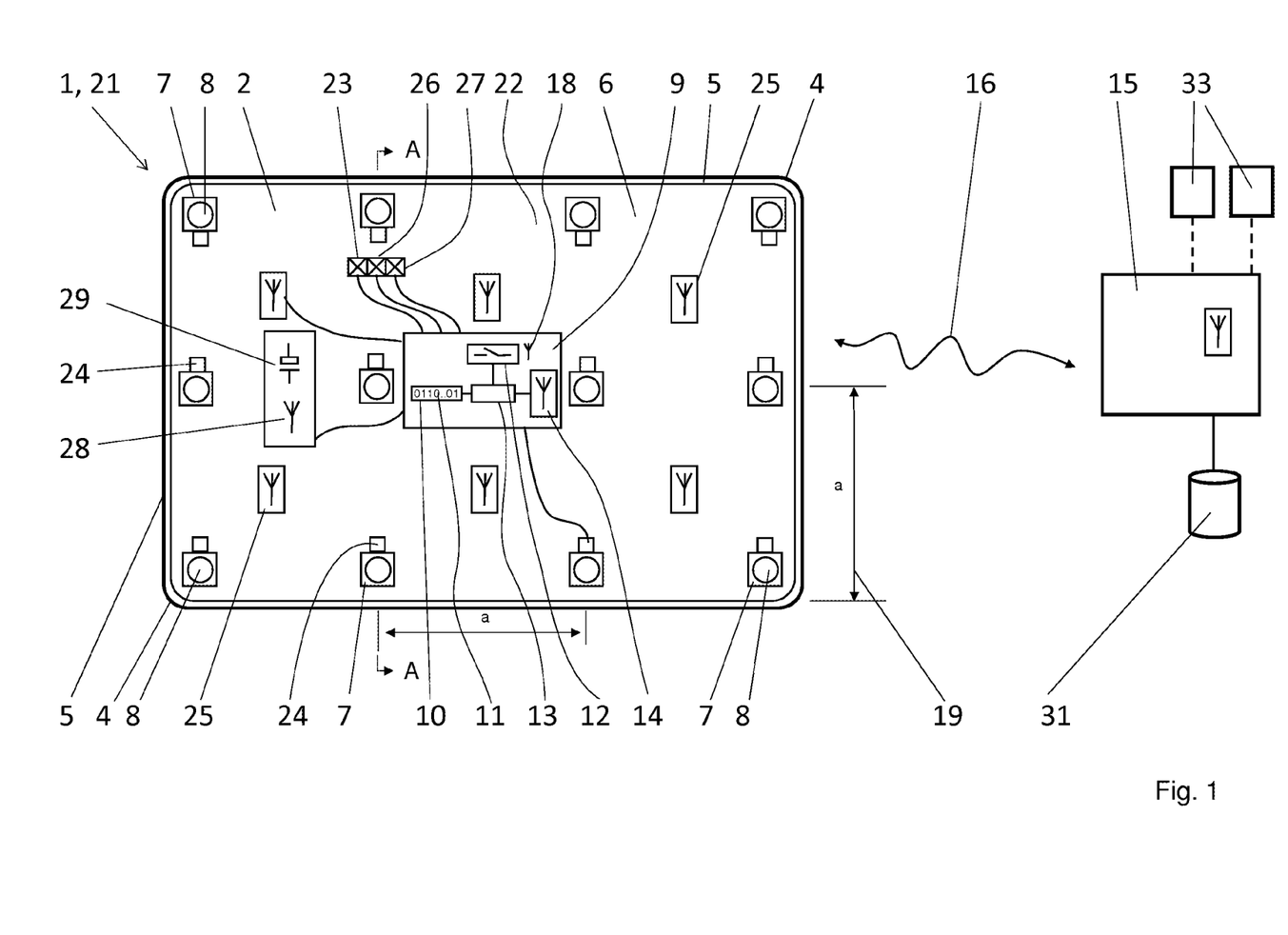
FIG. 1 shows a schematic illustration of a device according to the invention and a controller.
Figure 2:
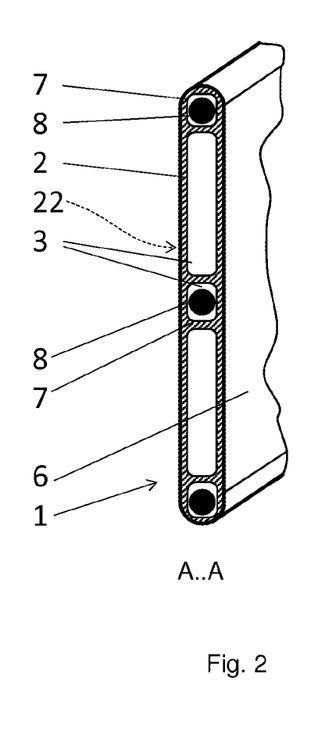
FIG. 2 shows a perspective internal view of the device according to FIG. 1 in sectional view A-A.
Figures 3, 4:
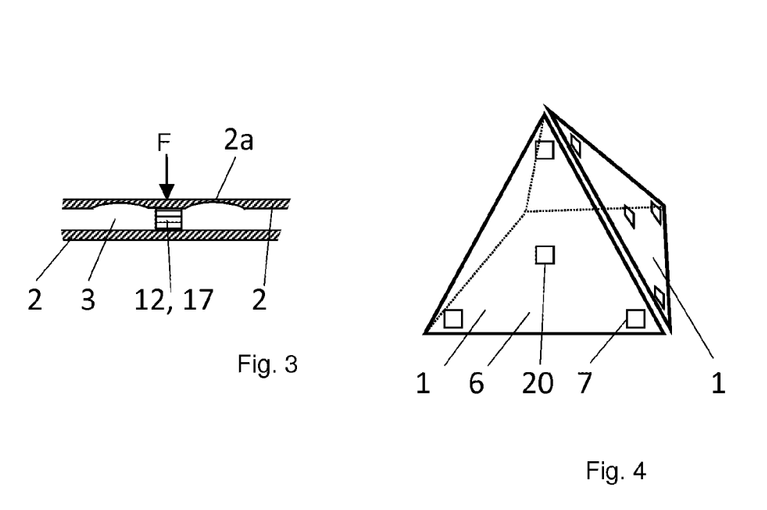
FIG. 3 shows a schematic illustration of a switch comprising a piezoelectric element.
FIG. 4 shows a schematic illustration of a three-dimensional structure of devices according to the invention.
Figure 5:
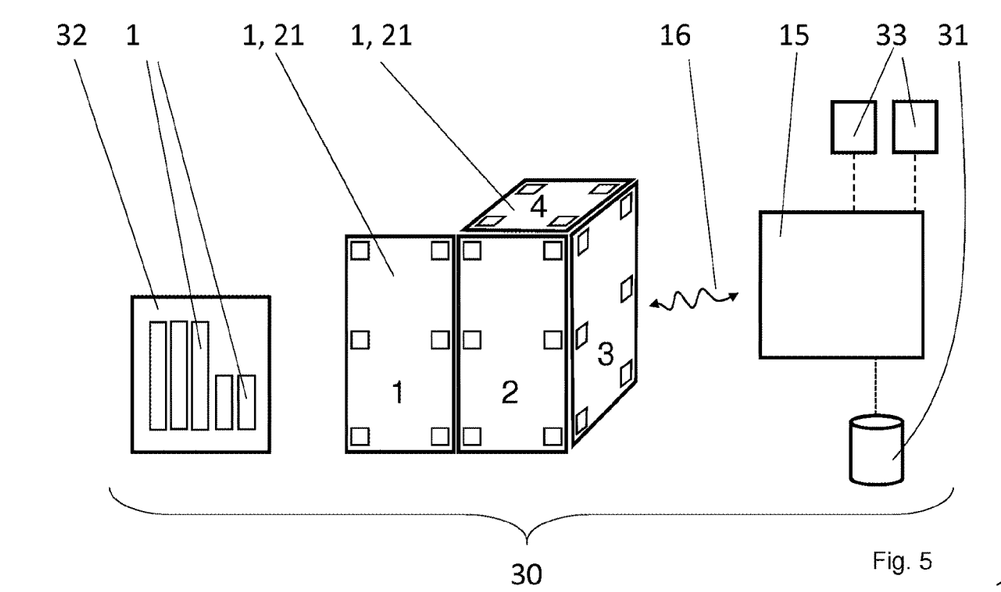
FIG. 5 shows a schematic illustration of a set according to the invention comprising a plurality of devices as well as a controller, to which further electronic modules are connected, as well as comprising a charging station.

Various devices 1 according to the invention, which are partially joined together to form three-dimensional structures, are illustrated in FIGS. 1, 4, and 5. FIG. 2 shows the interior of a device 1 of this kind in section. Each of these devices 1 comprises a housing 2 comprising an interior 3, wherein the housing 2 has at least three corners 4 and at least three edges 5, which connect the corners 4 to one another and border a surface segment 6. Cages 7 are configured in the interior 3 adjacent to the surface element 6 at least in each corner 4 and/or at least in the edges 5 and/or in grids 19, wherein a permanent magnet 8 is arranged in a captive and movable manner in each of said cages, so that all magnets 8 can orient themselves, depending on the polarization. Even though round magnets 8 are illustrated here throughout, magnets 8 in other shapes, for example cylindrical magnets, can be used as well. The cages 7 have to be large enough to permit the movability of the magnets 8, which is necessary for the orientation. In addition, they can be configured to be larger, so that a limited local displacement of the magnets 8 is also permitted thereby. This may be necessary when devices 1 are to be fastened on their magnets 8, which have different magnet positions, for example because a triangular device 1 is to be connected to a spherical segment-shaped device 1. The cages 7 are preferably lined with an insulating material, for example with felt, in order to avoid or to reduce unwanted noises when moving the devices 1.

According to the invention, the housing 2 comprises an electronic unit 9 comprising a data memory 10, on which at least one ID number 11 is electronically stored, a switch 12, which can be triggered by actuation by a user, as well as comprising a transmitter 13, which is connected to the switch 12 and the data memory 10, comprising an antenna 14, which transmitter, when the switch 12 is actuated, can wireless transmit at least the ID number 11 to a controller 15. In addition, a further process can be triggered thereby, which assigns the device 1 a meaning within the scope of the project or group work.

An electronic unit 9 of this kind can manage without energy storage and is thus extremely cost-effective and user-friendly. The ID number 11 is transmitted in the form of data 16 to the controller 15, which reacts accordingly upon receipt, depending on the program, with which it is operated. According to the mentioned example, said controller can ask the user to transmit information to this device 1. Finally, the controller 15 stores corresponding information in a database 31 provided for this purpose. Further electronic modules 33 are used for the communication with the user, for example microphones and loudspeakers, when the communication is performed acoustically and with speech recognition. Screen and keypad, a character recognition module, for example a touchscreen with pen or image processing or a photo or video camera, are other options for electronic modules 33.

The transmitter 13 of the electronic unit 9 can preferably also receive data 16 transmitted wirelessly by a controller 15 by means of the antenna 14 and can transfer it to the data memory 10 for storage purposes. The switch 12 can be actuated by the user in a variety of ways. The actuation by touch, capacitively, inductively, by pressing or by introduction into an area of a near-field signal, have proven to be particularly suitable. The actuation is particularly advantageous, when energy can be brought to the transmitter 13 thereby, which is sufficient for transmitting the required data 16 to the controller 15. The switch 12 can in particular be equipped with a piezoelectric element 17 for generating the transmission energy, which is required for transmitting the ID number 11. A possible exemplary embodiment is illustrated in FIG. 3, in the case of which the housing 2 around the support around the piezoelectric element 17 is configured as membrane 2*a* with reduced wall thickness. The energy applied to the element 17 by the user is converted into a voltage, which can subsequently be used for transmitting the data 16. Alternatively thereto, the switch 12, as illustrated in FIG. 1, can comprise an RFID transponder 18, which can be activated by a near-field transmitter, whereby the switch 12 is triggered. The energy introduced by the near-field transmitter is also sufficient for transmitting the ID number 11 to the controller 15. For all mentioned examples, it is not necessary to provide an energy storage. Additionally or alternatively, energy from radio waves from the surrounding area can be used to transmit data.

Due to the fact that the device 1 comprises an electronic unit 9, it turned out to be expedient to configure the housing 2 to be waterproof. When cleaning the surfaces, the device 1 can thus be immersed into a bath without being damaged thereby.

The device 1 has a further advantage when its corners 4 and edges 5 have phases or roundings. Devices 1 of this kind can abut on corners 4, edges 5 or surface segments 6 of a similar device 1 at different angles.

A further advantage is also at hand, when magnets 8 are arranged in cages 7 of the device 1 in the interior 3 adjacent to the surface segment 6 in grids 19, preferably at even grid distances a of 0.5-10 cm, in particular of 5 cm. This cannot always be complied with in the case of devices 1, which do not have a rectangular or cuboid shape. Larger cages 7, in the case of which the magnets 8 can shift to a limited extent, are thus advantageous. In addition, a cage 7 comprising a magnet 8 is preferably arranged in the interior 3 downstream from the center of area 30 of the surface segment 6.

The devices 1 preferably have the shape of a rectangle, square, triangle, circle, trapezoid, rhombus, rhomboid, cuboid, cylinder, of a pyramid, of a tetrahedron, of an octahedron, of a ball segment, or a combination thereof or of a part thereof. Platonic bodies of all kinds are more suitable as bodies with free shapes. In particular devices 1, which are configured to be flat as plate 21, so that a rear surface segment 22 of identical size and mirrored shape is in each case located parallel opposite to the surface segment 6, are suitable. All magnets 8, which are arranged in cages 7 in the interior 3 adjacent to the surface segment 6 in grids 19 and/or in the center of area 20, equally adjoin the rear surface segment 22, so that they simultaneously act in the directions of both surface segments 6, 22. Plates 21 of this kind, as also illustrated in FIGS. 4 and 5, can be assembled in a versatile manner, also three-dimensionally. In FIG. 4, four triangular plates 2 are held together to form a pyramid. The electronic units 9 are not illustrated for the sake of clarity.

According to the invention, the electronic unit 9 of a device 1 can comprise a position sensor 23, which can identify the position of the device 1 with respect to the room coordinates x, y, and z. It can be recognized thereby, for example, whether the plate 21 stands or lies. Alternatively or addition, the electronic unit 9 can then comprise one or a plurality of Hall magnet sensors 24 or transmitter-receiver systems 25, for recognizing and identifying other nearby devices 1, which are magnetically fastened to this device 1. For this purpose, a Hall magnet sensor 24 is preferably attached as closely as possible to each of the magnets 8, while the transmitter-receiver systems 25 are preferably arranged centrally between the grids. In particular NFC transponders/receivers are suitable as transmitter-receiver systems 25. Apart from information, these bidirectionally communicating near-field transmitters/receivers can also transmit energy to the receiver. In addition, they have an expanded ID number, which, for example, comprises the ID number 11 of their device 1 and also details relating to the position on this device 1, on which the respective transmitter-receiver system 25 is arranged. During use, the transmitter-receiver system 25 can at best identify a plurality of other transmitter-receiver systems 25 of adjacent devices 1, but with different signal strengths. The signal strength can be considered in response to the evaluation, so that the exact arrangement of the adjacent device 1 relative to the own device 1 can be identified well. The electrical connections to the sensors 23, 24, 26, 27 and to the transmitter-receiver systems 25 are only illustrated sporadically in the figures, so as to ensure clarity.

Alternatively or additionally thereto, the electronic unit 9 can comprise an acceleration sensor 26 and/or a noise sensor 26. The noise sensor 26 can recognize, for example, a knocking on the surface segment 6. If all devices 1, which are attached to one another, are picked up together and are brought to a different location, the controller can recognize the group association of all of these devices 1 in that their acceleration sensors react synchronously. The same applies in the case of simultaneous identification of a knocking in the case of all devices 1, which are connected to form a group, when the knocking noises can be transmitted well.

Additionally or alternatively thereto, the electronic unit 9 of a device 1 can comprise a radio transmitter 28, which can transmit the measurement data 16 identified by means of one or a plurality of sensors 23, 24, 26, 27 and/or the identities 11 identified by means of one or a plurality of transmitter-receiver systems 25, of nearby transmitter-receiver systems 25, to the controller 15. This radio transmitter 28 can be the radio transmitter 13 comprising the antenna 14, by means of which the ID number 11 is transmitted to the controller 25, or a further radio transmitter 28 can be arranged for this purpose.

In the case of a device 1, which comprises one or a plurality of Hall magnet sensors 24 or transmitter-receiver systems 25, the switch 12 can be able to prompt in response to the actuation that data 16, which is stored on data memories 10 of other recognized devices 1, is also transmitted to the controller 15. The electronic unit 9 of a device 1 of this kind preferably also has an energy storage 29 for storing sensors 23, 24, 26, 27, transmitter-receiver systems 25, RFID transponders 18 and/or radio transmitters 13, 28. It is important to note, however, that it is sufficient that one device 1 per group has an energy storage 29 of this kind, because the other devices 1, which directly or indirectly abut thereon, can be fed via said energy storage. The energy storage 29 can preferably be charged in a contact-free manner. This makes it easier to construct the housing 2 in a waterproof manner. In addition, not every device has to be connected to a cable when charging, it is sufficient to bring it close to the respective charging station.

FIG. 5 shows a set 30 according to the invention, which comprises a plurality of devices 1 of this kind as well as a controller 15, which is assigned to these devices 1. The controller 15 has wireless access to all data memories 10 of all devices 1 assigned thereto, as well as to the measurement data 16 identified by these devices 1, if they comprise sensors 23, 24, 26, 27 and/or transmitter-receiver systems 25. In addition, the controller 15 has access to a database 31, which comprises the ID numbers 11 of all devices 1 assigned thereto, as well as additional data 16 relating to these ID numbers 11.

This additional data 16 can be information, which was identified by a user during the work process, or information relating to the device 1, for example details relating to its shape, the number and arrangement of its magnets 8 and/or details relating to its sensors 23, 24, 26, 27 and/or transmitter-receiver systems 25. At the beginning of the work process, for example the information that no data 16 relating to this device 1 is stored yet, can be gathered from the database 31.

If individual or a plurality of electronic units 9 of the devices 1 of the set 30 comprise one or a plurality of sensors 23, 24, 26, 27 and/or transmitter-receiver systems 25, the data 16 determined therewith can preferably also be transmitted to the controller 15 via radio, so that the controller 15 can generate lists and/or make calculations based on the received measurement data 16. Alternatively, the controller 15 can generate three-dimensional models on the basis of the received data and measurement data 16, comprising bodies, which represent the spatial arrangement of the devices 1 to one another. The controller 15 can in particular generate a model plan 34 therefrom comprising internal logical connections, such as, for example, a Scrum/Kanban board display, a process schedule, a project schedule, a time schedule, a development schedule, a production schedule, an organigram, a SWOT matrix, a value chain analysis or a sales plan. This depends on the software and the settings thereof, which is utilized for the set 30. The same set 30 can thus be utilized, for example, for visualizing parts of buildings as well as for establishing a business plan.

The set 30 can be supplemented with a charging station 32, in which the energy storages 29 of the devices 1 can be changed. This charging station 32 can have the shape of a carrying case, in which the devices 1 can be transported, and which can be connected to a mains supply for charging the devices 1, in response to the storage. The devices 1 can thus always be charged comfortably overnight, in order to be ready for use again the next day. The advantage of rechargeable energy storages 29 is that no batteries need to be changed during a work process. In addition, the housing 2 of the device 1 thus does not need to be opened, which could reduce the water-proofness of the housing.

Together with a software, which is selected or adapted specifically for the purpose of the utilization, as well as with electronic modules 33, which are suitable for the respective purpose, which are provided on the one hand for the communication with the user and for the input of information, but, on the other hand, also for the display of the interim results and end results, the set 30 forms a system, which is operational according to the project. The electronic modules 33, for example loudspeakers, projectors, screens, tablets, graphic tablets, touch screens, keypads, smartphones and/or microphones for the interactive input of data, can already be present in a conference room to some extent and/or can be provided by the participants or moderators. The software, which can be purchased separately, together with the electronic modules 33, thus belongs to the finished system, but not to the set 30, which can also be purchased separately. In addition, individual devices 1 are offered individually as additional components, in order to expand a set. This is why protection is claimed for an individual device 1 alone.

According to the invention, the set 30 is to be utilized for moderation, training, project work or group work.

Together with at least one electronic module 33, which is connected to the controller 15 of the set 30, the set 30 according to the invention can be utilized to perform a method for digitizing manually compiled specifications. This method according to the invention comprises the following steps: (a) In a work process, two or more devices 1 are arranged in a room comprising a controller 15 and are fastened to one another by means of their magnets 8; (b) at least one switch 12 of a device 1 is actuated; (c) at least the ID number 11 of the respective device 1 is transmitted to the controller 15; (d) the controller 15 accesses the database 31 and retrieves data 16 on the ID number 11 of this device 1, which is stored; (e) (optionally) based on this data 16, the controller 15 issues instructions to the electronic module 33, (f) the same or a different electronic module 33 transmits information, which was input by the user, to the controller 15; (g) the controller 15 digitally stores the received information in the database 31.

The instruction in step (e) to the electronic module 33 can only be, for example, that it informs a photo camera that the next photo is to be sent to the controller 15 immediately, or that it informs a different module 33, for example a tablet, that it is next and is to send the information obtained next to the controller. If the process is kept very simply and if only a single device is available, this step (e) can also be skipped.

A plurality of devices 1, which are held together on their magnets 8, are preferably brought together, whereby a three-dimensional structure is created before a switch 12 is actuated. For example smaller blocks of small devices 1 can also be constructed, which, in turn, are encased by larger blocks of larger devices 1. The association in the form of an integration can be visualized in this way. Work can in particular be performed symbolically with the different sizes of the devices 1, when meaning is to be displayed.

In a preferred method, the controller 15 successively queries all devices 1, which are connected thereto, on a regular basis for data 16, which was identified by all sensors 23, 24, 26, 27 and transmitter-receiver systems 25 integrated there. Said controller subsequently assigns this data to the corresponding devices 1 and stores it in the database 31. A changed association is thus identified automatically, the actuation of the switches on each device 1 is then possibly only still needed to assign the device a name or meaning and/or to ask assistance from the device. Those can be stored via software and can comprise, for example, basic information on the procedure of the next steps.

When the electronic units 9 of the devices 1 comprise transmitter-receiver systems 25 for recognizing and identifying nearby other devices 1, which are magnetically fastened thereto, energy as well as information can then be transported and returned again via respective nearby transmitter-receiver systems 25 via a plurality of devices 1. Finally, this gathered amount of information, which originates from a plurality of devices 1 attached to one another in different stages, is transmitted to the controller 15 in a collected manner. Only a first one of the devices 1 has to have a supply by an energy storage 29 for this purpose. The other devices 1, up to a maximum of 8 devices in total, are sufficiently supplied by the transmitter-receiver systems 25, so that the information can be collected.

With the actuation of one of the switches 12 of the devices 1, the data 16 of the sensors 23, 24, 26, 27, which are integrated in the electronic unit 9, and/or of the transmitter-receiver systems 25 are preferably also transferred to the controller 15.

After receipt of data 16 from one or a plurality of the devices 1, the controller 15 preferably evaluates this data 16 and issues instructions, according to a specification, to a further electronic module 33, to which it is connected. Such an evaluation is a function of the specification or of the selected software, respectively. The results of the evaluations can thus be extremely divergent.

For example, the controller 15 identifies the spatial arrangements of the joined devices 1, stores them and graphically illustrates them on a module 33, which is suitable for this purpose. Or it generates further lists based on its received data 16 as well as based on the information from the database 31, performs a calculation, and/or draws up an offer or a plan, such as, for example, a business plan, a project schedule, a process schedule, a blueprint or a Scrum/Kanban board display.

Figure 6:
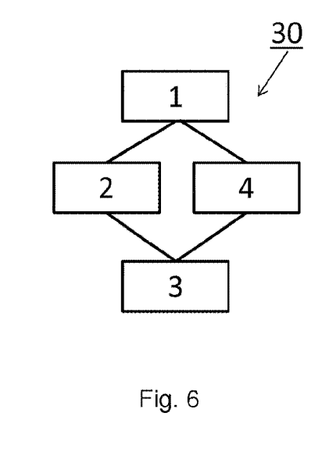
FIG. 6 shows an example of a model or of a model plan.

An example of such an evaluation is given in FIG. 6. Using the example of the arrangement of the devices 1 of FIG. 5, the device with number 1 can represent the "shopping", according to the above-mentioned example of the cooking of an omelet. Device 1 with number 2 then represents the "prepare dough" and "bake dough", device 1 with number 4 represents the "prepare filling" and device 1 with number 3 represents the "eating", which represents the end of the project. A further device 1, which represents "set table", could be concealed behind device 1 with number 4, parallel to device 1 with number 2. The time axis runs from left to right in this example, devices 1 in transverse orientation symbolize interim results or end results, all processes, which are at the same location on the timeline, also take place simultaneously. This example is visualized in FIG. 6, It is obvious that such an example can be arbitrarily more complex, for example when organizing a wedding, a development project or Olympic Games.

The advantage of the present invention is that the devices 1 have a haptic, contrary to virtual structures, which are displayed on a display. The individual tasks can thus be touched, can be connected to and within one another and separated from one another, picked up, brought to a different table or into an adjoining room, for the undisturbed, simultaneous work of the individual groups without a hierarchy. In addition, front and rear side of a device 1 can be labelled independently of one another and thus allow for further work options. The visualization of the structures is in particular appealing, because they can be connected in a three-dimensional manner, represent different heights and volumes, whereby a power is displayed. The participants or users can walk around the structures. Not all information is revealed simultaneously to the user, for instance a certain filter, but, on the other hand, also a focus is drawn to the devices 1, which appear when walking around them, while others disappear.

Figure 7:
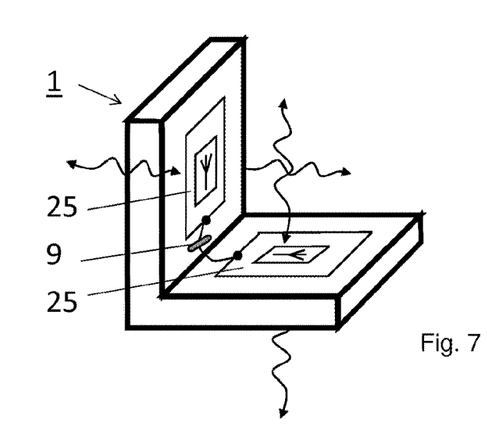
FIG. 7 shows a device for transmitting and receiving energy and information.

A further advantage of the invention is described in FIG. 7. It shows a device 1, which is suitable for transmitting and receiving energy and information in the horizontal direction as well as in the vertical direction. It thus comprises an electronic system comprising two connected NFC transponders/receivers 25, one of which is arranged horizontally or vertically, respectively, in each case. According to their orientation, they can transmit energy and information into both rooms, orthogonally to their area orientations and also receive it from them. If other devices 1 are now in the vicinity of this device 1, in particular because they are directly or indirectly fastened thereto on their magnets, energy and information can be transported via a plurality of NFC transponders/receivers 25. The first one of these devices 1 is preferably supplied inductively, in turn by an NFC transponder/receiver, which is connected to a supply, such as a battery or to the mains.

Information can thus be queried and collected from different devices 1 via a plurality of stages, so that all of the information on an entire group can finally be transmitted to the controller 15 at the touch of a button. Any queried NFC transponder/receiver 25 cannot only provide information on which further NFC transponders/receivers 25 are located nearby, i.e. within its reception range, but also provide an estimation of the distance thereto based on the strength of the signal response. The controller 15 can determine and evaluate the spatial arrangement of the individual devices relative to one another based on this information. Groups as a whole can thus be identified and evaluated with the touch of a button, as has been described in connection with FIG. 6.

It turns out that information of at least 2 or 3 to 8 devices 1, in the case of sufficient supply and/or skillful arrangement also of up to 12 or 15 devices 1 can be collected in a cascade by means of this method. Accordingly, there are more, when lateral branches are included.

Devices 1 in the shape of cuboids or blocks, which are each provided with at least one NFC transponder/receiver 25 on all sides, are mentioned here as further, non-illustrated example. When stacking for example eight such cuboids to form a tower, all information from these cuboids can be collected and can be transmitted to the controller 15 by the touch of a button. The lateral length of such devices 1 is thereby irrelevant, as long as a sufficient number of NFC transponders/receivers 25, which are internally connected to one another, is arranged on each surface segment 6. Due to the fact that the range of the NFC transponders/receivers 25 is only a few centimeters, for example 7 cm, the devices 1 can be dimensioned correspondingly small or can be equipped with the necessary number of NFC transponders/receivers 25.

In addition, it is very easily possible to specify a chronological order. Two objects connected by a simple connection, for example by a string, which each comprise an NFC transponder/receiver 25 and preferably a permanent magnet or a ferromagnet, can be identified as "first" and "afterwards" and can be stored accordingly in the database 31 with their ID numbers 11. When these objects are finally attached to two different groups, the controller can recognize unambiguously that the work of the one group has to be performed "first" and that of the other group "afterwards". Connected objects of this kind, not illustrated in the figures, can also be utilized accordingly with the other devices, in order to specify orders, hierarchies or inner structures.

LIST OF REFERENCE NUMERALS 1 device
2 housing
2a membrane on the housing
3 interior
4 corner
5 edge
6 surface segment
7 cage
8 permanent magnet, magnet
9 electronic unit
10 data memory
11 ID number
12 switch
13 transmitter
14 antenna
15 controller
16 data, measurement data
17 piezoelectric element
18 RFID transponder
19 grid
20 center of area
21 plate
22 rear surface segment
23 position sensor
24 Hall magnet sensor
25 transmitter-receiver system, NFC transponder/receiver
26 acceleration sensor
27 noise sensor
28 radio transmitter
29 energy storage
30 set
31 database
32 charging station
33 electronic module
34 model, model plan
a grid distances

The invention claimed is:

1. A device for use as a tool for presentation and training in project or group work, the device comprising:
a housing comprising an interior, wherein the housing has at least three corners and at least three edges, which connect the corners to one another and border a flat surface segment, and wherein the housing is configured to abut on corners, edges, or surface segments of a similar device,
wherein cages are configured in the interior at least in each corner and/or at least in the edges and/or in grids adjacent to the flat surface segment,
wherein a permanent magnet is arranged in each of the cages in a captive and moveable manner, so that all the magnets can orient themselves, depending on polarization,
wherein the housing comprises an electronic unit comprising:
a data memory, on which at least one ID number is electronically stored,
a switch having a switch area arranged on the flat surface segment, the switch area being flat with the flat surface segment and not protruding from the flat surface segment so as not to be actuated when a flat surface segment of another device is in contact with the flat surface segment comprising the switch, the switch being manually actuated by pressing on the switch area by a user, and
a transmitter connected to the switch and to the data memory, the transmitter comprising an antenna, and
wherein when the switch is actuated by pressing on the switch area by the user, the transmitter wirelessly transmits at least the ID number to a controller and a process is triggered in which the user assigns the device a name or meaning within the scope of the project or group work.

2. The device according to claim 1, wherein the transmitter can also receive data transmitted wirelessly by a controller and can transfer the name or meaning assigned to the device by the user to the data memory for storage purposes.

3. The device according to claim 1, wherein the switch is equipped with a piezoelectric element configured to generate transmission energy required by the transmitter for transmitting the ID number.

4. The device according to claim 1, wherein the switch comprises an RFID transponder, which can be activated by a near-field transmitter, or wherein energy from radio waves from the surrounding area can be used for triggering the switch.

5. The device according to claim 1, wherein the housing is closed in a waterproof manner.

6. The device according to claim 1, wherein the corners and edges have phases or roundings, in order to be able to abut on corners, edges or surface segments of a similar device at different angles.

7. The device according to claim 1, wherein the magnets are arranged in the cages in the interior adjacent to the flat surface segment in grids.

8. The device according to claim 1, wherein one of the cages comprising one of the magnets is arranged in the interior downstream from the center of area of the flat surface segment.

9. The device according to claim 1, wherein the device is configured to be flat as plate, so that a rear surface segment of identical size and mirrored shape is located parallel opposite to the flat surface segment, and wherein all of the magnets, which are arranged in the cages in the interior adjacent to the flat surface segment in grids and/or in the center of area, equally adjoin the rear surface segment, so that the magnets can simultaneously act in the directions of both surface segments.

10. The device according to claim 1, wherein the electronic unit further comprises:
 a position sensor, configured to, when operating, identify the position of the device with respect to room coordinates x, y, and z,
 at least one Hall magnet sensor or transmitter-receiver system, configured to, when operating, recognize and identify other nearby devices, which are magnetically fastened to the device, and
 at least one of an acceleration sensor or a noise sensor configured to, when operating, recognize a knocking on the flat surface segment,
 wherein data is transmitted by the transmitter based on recognition of the knocking on the flat surface segment.

11. The device according to claim 1, wherein the device comprises an electronic system comprising two connected NFC transponders/receivers, which are oriented orthogonally to one another.

12. The device according to claim 10, wherein the electronic unit further comprises a radio transmitter, which can transmit the measurement data identified by at least one Hall magnet sensor or transmitter-receiver system, of nearby transmitter-receiver systems, to the controller.

13. The device according to claim 1, comprising at least one Hall magnet sensor or transmitter-receiver system, wherein the switch is able to prompt in response to the actuation that data, which is stored on data memories of other recognized devices, is also transmitted to the controller.

14. The device according to claim 10, wherein the electronic unit also comprises an energy storage for supplying sensors, RFID transponders, transmitter-receiver systems and/or radio transmitters.

15. A set for presentation and training in project or group work, the set comprising:
 a plurality of devices according to claim 1, and
 a controller assigned to the devices,
 wherein the controller has wireless access to all data memories of all of the devices assigned thereto, as well as to measurement data identified by the devices, and,
 the controller has access to a database, which comprises the ID numbers of all of the devices assigned thereto, as well as the names or meanings assigned to the devices by the user.

16. The set according to claim 15, wherein the electronic unit of each of the plurality of devices comprises:
 a position sensor configured to, when operating, identify the position of the respective device with respect to room coordinates x, y, and z,
 at least one Hall magnet sensor or transmitter-receiver system configured to, when operating, recognize and identify other nearby devices, which are magnetically fastened to the respective device, and
 at least one of an acceleration sensor or a noise sensor configured to, when operating, recognize a knocking on the flat surface segment,
 wherein the data identified by the at least one sensor or transmitter-receiver system of all devices is transmitted to the controller via radio based on a recognition of the knocking, and
 the controller performs at least one of generating lists or performing calculations based on the received measurement data.

17. The set according to claim 16,
 wherein the structure of the devices represents a meaning within the scope of the project or group work, and
 the controller can generate a three-dimensional model on the basis of the received data and measurement data, which represent the spatial arrangement of the devices to one another.

18. The set according to claim 16, wherein the controller is configured to, when operating, generate a model plan comprising internal logical connections based on the received data and measurement data where the model plan conforms to at least one of a Scrum board or a Kanban board display, a process schedule, a project schedule, a time schedule, a development schedule, a production schedule, an organigram, or a sales plan.

19. A method for digitizing manually compiled specifications, the method comprising:
 arranging two or more of the devices according to claim 1 in a room having a controller, with the two or more devices fastened to one another by the magnets;
 manually actuating the switch of at least one of the two or more devices by the user pressing on the switch area of the switch; and
 in response to the switch being manually actuated by the user, performing a process that includes:
  transmitting at least the ID number of the device whose switch was actuated to the controller;
  asking the user to assign the device whose switch was actuated a name or meaning within the scope of the project or group work;
  receiving the name or meaning assigned by the user; and
  digitally storing the name or meaning in the database along with the ID number of the device whose switch was actuated.

20. The method according to claim 19, further comprising bringing the two or more devices which are held together by their magnets together so as to create a three-dimensional structure before the switch is actuated, the three-dimensional structure representing a meaning within the scope of the project or group work.

21. The method according to claim 19, wherein the controller successively queries all devices, which are connected thereto, on a regular basis for data, which was identified by all sensors and transmitter-receiver systems integrated there, assigns the data to the corresponding devices and stores the data in the database.

22. The method according to claim 19, wherein the electronic units of the devices comprise transmitter-receiver systems for recognizing and identifying other nearby devices, which are magnetically fastened thereto, whereby energy as well as information is transported and returned again via respective nearby transmitter-receiver systems via the devices, and wherein the information is transmitted to the controller.

23. The method according to claim 19, wherein information of the devices is collected in the manner of a cascade and then the information of all of the devices is transferred to the controller by one of the devices in response to the switch being manually actuated by the user.

24. The method according to claim 22, wherein estimation of distances between the devices is determined by the controller based on the strength of the signal responses received by a respective device and transmitted by the respective device to the controller.

25. The method according to claim 19, wherein the process performed in response to the switch being manually actuated by the user further includes transferring data from sensors and/or transmitter-receiver systems, which are integrated in the electronic unit to recognize and identify other devices that are magnetically fastened to the device, to the controller.

26. The method according to claim 19, wherein the controller identifies the spatial arrangements of the joined devices, stores them and graphically illustrates them on a module, the spatial arrangements of the joined devices representing a meaning within the scope of the project or group work.

27. The method according to claim 19, wherein the controller generates further lists based on received data as well as based on the information from the database, and performs, based on the lists, the received data, and the information from the database, at least one of drawing up an offer or a plan comprising at least one of a business plan, a project schedule, a process schedule, or a Scrum or Kanban board display.

28. The device according to claim 1, further comprising:
a plurality of Hall magnet sensors and/or transmitter-receiver systems that are configured to recognize and identify other devices that are magnetically fastened to the device,
wherein when the switch is actuated by pressing on the switch area by the user, the transmitter wirelessly transmits data from the Hall magnet sensors and/or transmitter-receiver systems to the controller.

29. The device according to claim 1, further comprising:
a plurality of Hall magnet sensors and/or transmitter-receiver systems that are configured to recognize and identify other devices that are magnetically fastened to the device,
wherein when the switch is actuated by pressing on the switch area by the user, the transmitter wirelessly transmits to the controller information indicating that the device is connected to the other devices.

30. The device according to claim 1, wherein when the switch is actuated by pressing on the switch area by the user, a start of a program is triggered that asks the user to assign the device the name or meaning within the scope of the project or group work.

31. The method according to claim 19, wherein the process performed in response to the switch being manually actuated by the user further includes:
issuing instructions from the controller to at least one electronic module;
receiving, by the at least one electronic module, of the name or meaning assigned by the user; and
transmitting the name or meaning assigned by the user from the at least one electronic module to the controller.

32. The device according to claim 1, wherein the switch is not actuated by touch, the switch only being actuated by pressing on the switch area by the user.

33. The device according to claim 1, wherein the switch is not actuated by the user touching or moving the device, the switch only being actuated when the switch area is pressed on by the user.

* * * * *